INVENTORS
THOMAS J. REGAN
SAM A. JONES
EDWARD J. WASP

BY Stanley J Price their ATTORNEY

2,880,745
Patented Apr. 7, 1959

2,880,745

CLOSED CIRCUIT PIPELINE AND CONTROL SYSTEM THEREFOR

Thomas J. Regan, Sam A. Jones, and Edward J. Wasp, Pittsburgh, Pa., assignors to Consolidated Coal Company, Pittsburgh, Pa., a corporation of Pennsylvania Application January 17, 1957, Serial No. 634,718

19 Claims. (Cl. 137—207)

This invention relates to a closed circuit pipeline and more particularly to a closed circuit pipeline adapted to transport coal suspended in a liquid medium through long distances.

The transportation of coal through pipelines was long ago conceived as having attractive possibilities from the standpoint of convenience and reduced costs. Substantial effort has been directed toward commercial realization of these attractive possibilities by the use of water as a carrier for the coal. The use of water as a carrier, however, added to the already numerous problems present in transporting a coal slurry over long distances.

It was discovered by experimental studies that a coal-water slurry has both a corrosive and erosive effect on the inner wall of the pipeline. It was further discovered that the corrosive effect of the slurry could be reduced by transporting the slurry from the receiving station to the discharge station in a closed circuit and, therefore, not exposing the slurry to oxidizing conditions during transit. Treating the slurry with an inhibitor further reduces the corrosive effect of the slurry on the pipeline inner wall. In addition, it was discovered that the consumption of the inhibitor by the slurry as it is transported in the pipeline is a first order reaction and by incrementally adding the inhibitor to the slurry as it is transported through the pipeline inhibitor consumption is reduced.

The erosive effect of the coal-water slurry, it is believed, is caused by the rubbing of the coal particles on the inner wall of the pipeline as the coal particles are transported therethrough. If the coal particles are maintained in suspension in the water carrier during transit, the erosion of the pipeline inner wall is reduced to a minimum. The maintenance of the coal particles in suspension during transportation is dependent upon several factors. Among others, there are the factors of particle size and slurry velocity. If the velocity of the slurry as it is transported through the line is maintained above a predetermined velocity, little settling of the coal particles occurs and erosion is maintained at a minimum. Erosion of the pipeline inner wall may be further reduced by treating the slurry with an erosion inhibitor that forms a lining on the pipeline inner wall to insulate the wall from the rubbing action of the coal particles.

The requirement that the pipeline be a closed circuit to minimize the corrosive effect of the slurry and the requirement that the velocity of the slurry be maintained above a predetermined minimum velocity to minimize the erosive effect of the slurry presented new problems in the pumping or transporting of a slurry over long distances. The most desirous means, from an economic standpoint, to attain the required high pressure staging at the receiving station and at the intermediate stations necessitated the employment of positive displacement pumps. Heretofore, to the best of our knowledge, the successful use of positive displacement pumps in a closed circuit pipeline having intermediate booster stations has not been attained.

The restriction on the use of positive displacement pumps in a closed circuit pipeline is attributed in part to the instantaneous flow stoppage of the material being transported with each stroke of the pump piston. The flow stoppages result in so-called pressure surges within the pipeline. These pressure surges, commonly called "water hammer," can damage or even destroy the pipeline and pumping equipment.

In addition to the mechanical problems involved in employing positive displacement pumps in a closed circuit pipeline, there are also control problems which must be resolved before proper operation of the pipeline can be attained. For example, the pumps may be designed to have a given discharge rate when operating at a given speed or strokes per unit of time. It has been found, however, that there is a difference in the discharge rate from various positive displacement pumps although they are similar in construction. This difference in discharge rate may be attributed to different volumetric efficiencies that result from the wear of the pump piston and cylinder walls. Thus, the control system employed to regulate the output of the various pumps must be directly related to the output of the pump and not to the number of strokes of the piston per unit of time.

If the slurry is to be transported over long distances and a plurality of booster stations are required, additional control problems are involved. As stated, for satisfactory operation, the slurry must be continued in transit through the pipeline at a sufficient velocity to maintain the particles in suspension and thus minimize the erosive effect of the particles on the pipeline walls. If an intermediate booster station were to become inoperative, the station immediately upstream of the inoperative station would increase in discharge pressure to attempt to maintain the slurry in transport over the added segment of the pipeline formerly served by the inoperative station. In doing so, the positive displacement pumps, because of their construction and operating characteristics, may exceed their maximum design pressure and damage both the pipeline and the pumps. To prevent this inherent danger and yet allow the slurry to continue in transport through the pipeline, some type of control means should be provided to maintain a maximum pressure below the design pressure of the pumps and yet continue to transport the slurry through the pipeline.

In the past, the above high pressure control problem was circumvented by employing an open storage tank adjacent the upstream side of each booster station. The output of the upstream station would flow into the storage tank and the adjacent downstream booster station used the liquid in the storage tank as its source of supply. Thus, if a station became inoperative, the incoming liquid would simply continue to flow into the storage tank. This open storage tank method of control has limited applicability because the slurry would be exposed to oxidizing conditions while in the storage tank and there would be particle settling during storage in the tank and in the pipeline as flow stoppage occurred.

Throughout the specification and claims the terms upstream and downstream are used in the following manner. Upstream indicates a direction toward or nearer the source of the stream, in this instance the receiving end of the pipeline. Downstream indicates a direction away from the source and toward the terminus of the pipeline. When the terms are used to indicate conduits connected to a pump, the upstream conduit is the suction conduit leading to the pump inlet, the downstream conduit is the discharge conduit leading from the pump outlet.

Accordingly, the primary objects of this invention is to provide a closed circuit pipeline adapted to transport a slurry therethrough.

Another object of this invention is to provide a closed circuit pipeline employing booster stations having positive displacement pumping means.

Another object of this invention is to provide a closed circuit pipeline employing means to minimize pressure surges resulting from the use of positive displacement type pumps.

A further object of this invention is to provide a control system for a closed circuit pipeline wherein the medium being transported therethrough serves as the telemetering means between the various pumping stations.

A still further object of this invention is to provide a control system for a closed circuit pipeline where the downstream pressure is maintained below the maximum design pressure of the positive displacement pumps while slurry is continuously transported therethrough.

Other objects of this invention will become apparent from the following description, the drawings to which it relates, and the claims hereinafter set forth.

This invention consists of a new and improved closed circuit pipeline and a new and improved control system therefor and of the combination and cooperation of the parts thereof which will be described more fully hereinafter and the novelty of which will be particularly pointed out and distinctly claimed.

In the accompanying drawings to be taken as part of the specification there is fully and clearly illustrated one preferred embodiment of this invention, in which drawings.

Figure 1:
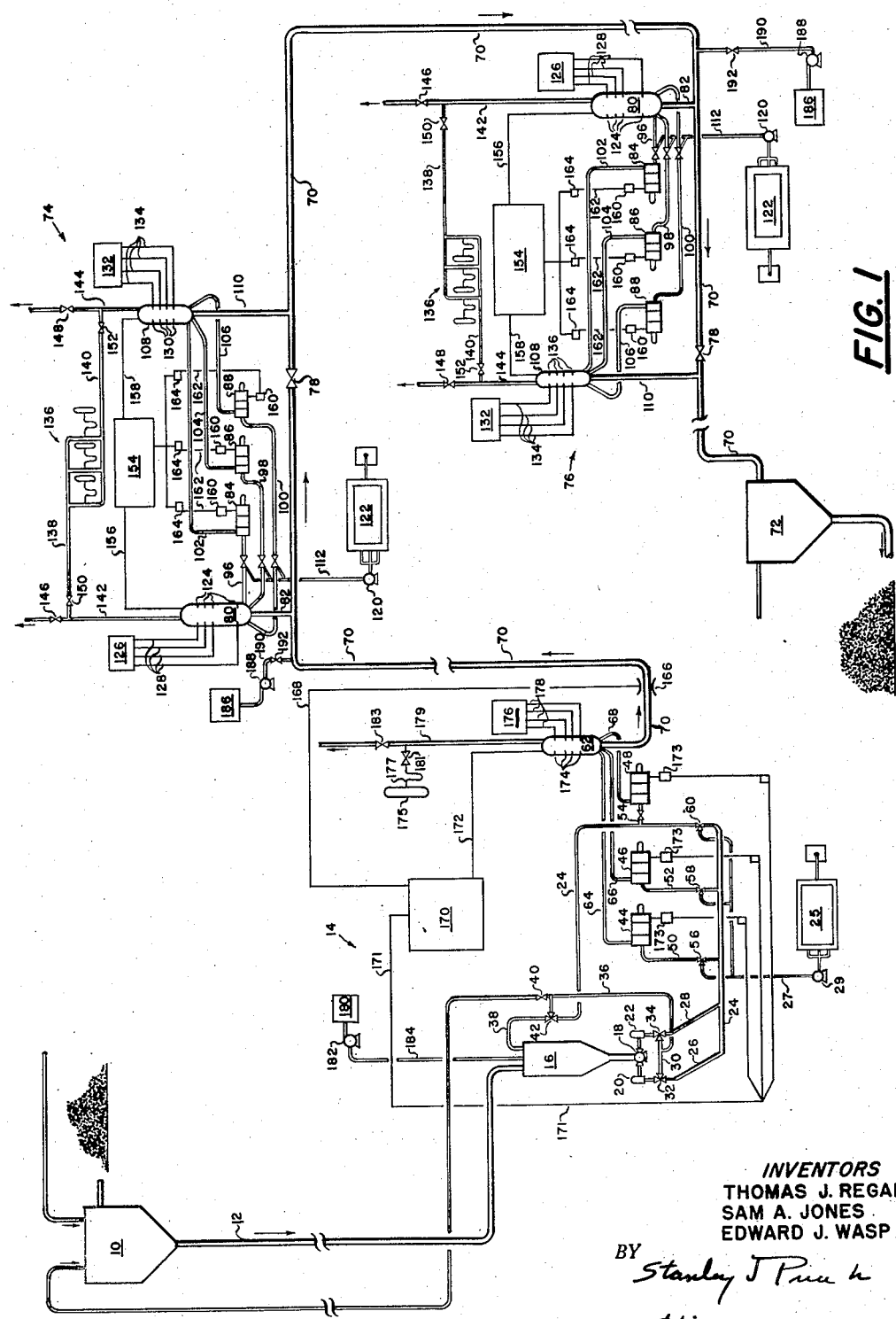
Figure 1 is a diagrammatic flow sheet of a closed circuit pipeline adapted to transport a coal-water slurry in accordance with the present invention.

Referring to Figure 1 of the drawing there is shown a closed circuit pipeline adapted to transport coal in the form of a water slurry over distances up to 100 miles or more. Coal and water are delivered to a slurry preparation tank 10 in which they are thoroughly mixed to form a slurry of uniform consistency. From the preparation tank 10 the slurry is conducted through a pipeline 12 by a pumping means (not shown) to the receiving station 14 where it is conveyed into a slurry storage tank 16. The slurry storage tank 16 has an outlet 18 interconnected with a pair of recirculating pumps 20 and 22. The outlets of the recirculating pumps 20 and 22 are each connected to a common conduit 24 by means of conduits 26 and 28. The outlets of the recirculating pumps 20 and 22 are also interconnected to each other by means of a conduit 30 and appropriate valve means 32 and 34. With this arrangement either of pumps 20 or 22 may be used to recirculate slurry from the tank 16 to a recirculating conduit 36 which is interconnected with a conduit 38 that terminates at the slurry storage tank 16. The conduit 36 also extends to the slurry preparation tank 10 and by means of valves 40 and 42 the recirculated slurry can either be diverted to the slurry preparation tank 10 or the slurry storage tank 16.

The receiving station 14 includes three positive displacement pumps 44, 46 and 48 that have their inlets connected by conduits 50, 52 and 54 to the supply conduit 24 which extends from the recirculating pumps 20 and 22. Appropriate three way valve means 56, 58 and 60 are positioned in the conduits 50, 52 and 54 to control the flow of slurry to the various pumps 44, 46 and 48. Supply conduit 24 continues beyond the connection to conduit 54 and is connected to conduit 38 at valve 42. The recirculating pumps 20 and 22 supply the pumps 44, 46 and 48 with slurry and recirculate excess slurry to the storage tank 16.

A supply of flushing water indicated by numeral 25 is connected to the conduits 50, 52 and 54 at valves 56, 58 and 60 by a conduit 27. A pump 29 is positioned in conduit 27 and is operable to convey flushing water to the inlets of the various pumps 44, 46 and 48 when desired.

The high pressure sides or outlets of the pumps 44, 46 and 48 are connected to a high pressure accumulator 62 by means of conduits 64, 66 and 68. The main pipeline 70 is connected at one end to the high pressure accumulator 62 and conveys the slurry from the receiving station 14 to the slurry separation tank 72 at the discharge end of the pipeline. The line 70, which represents the main slurry transport line, although indicated as broken in Figure 1, is a single continuous conduit and the breaks in the line are intended to illustrate extended lengths of the pipeline between the receiving and intermediate booster stations.

Figure 2:
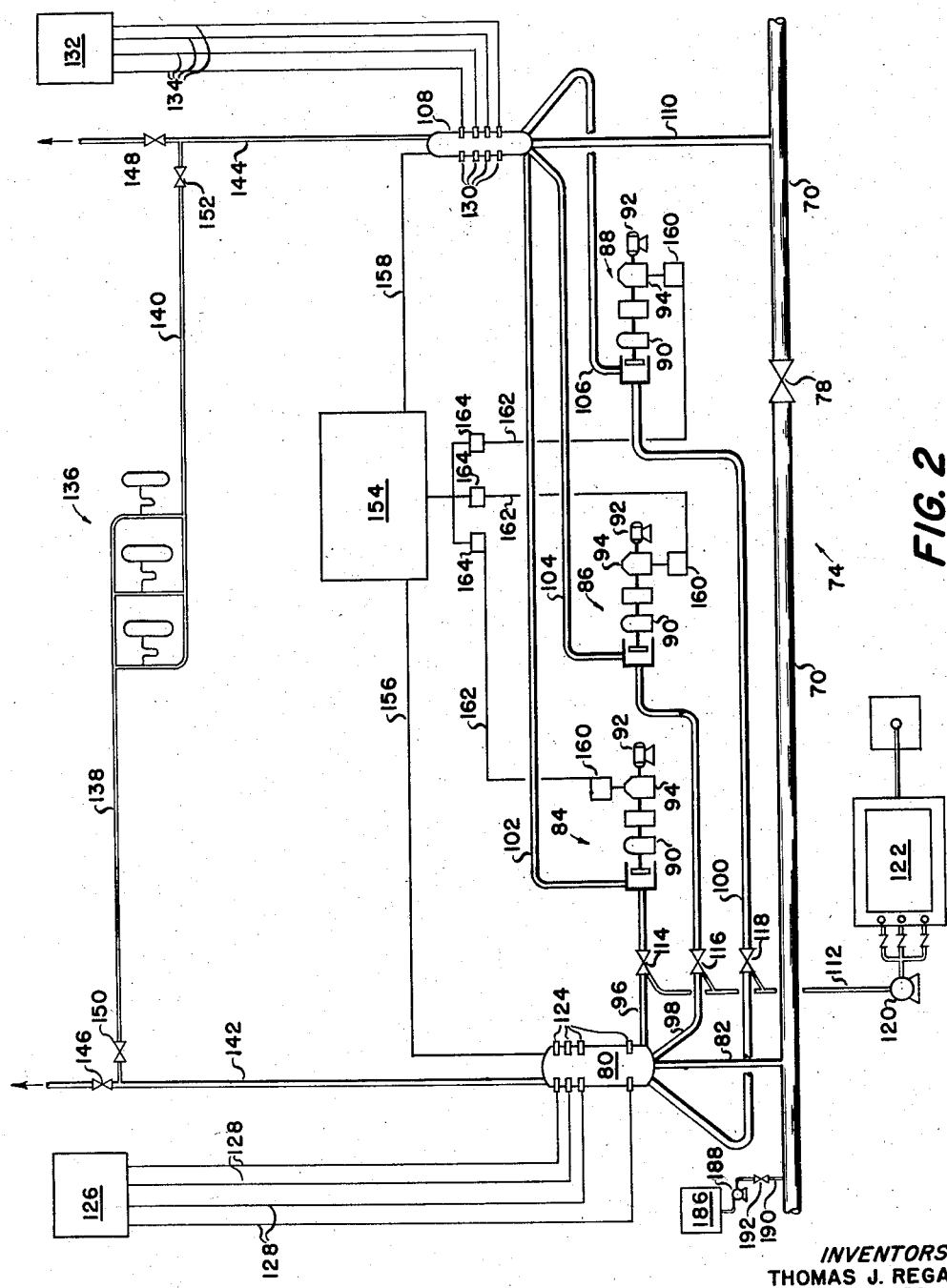
Figure 2 is a detailed diagrammatic view of one of the intermediate booster stations.

Interconnected in parallel with the pipeline 70 are a plurality, in this instance two, intermediate booster stations 74 and 76. The booster stations 74 and 76 are similar in construction and for convenience of illustration similar numerals refer to corresponding parts at each station. Although Figure 2 illustrates booster station 74 in detail, it should be understood the description is equally applicable to booster station 76. The booster stations 74 and 76 are arranged to increase the pressure of the slurry and assist in its conveyance through the pipeline to the slurry separation tank 72.

There is diagrammatically illustrated in Figure 2 an intermediate pumping station 74 with the pipeline 70 extending therethrough. A valve 78 is positioned in the pipeline 70 and is operable to divert the slurry being transported through pipeline 70 to a low pressure accumulator 80 by means of the connecting conduit 82. Thus when valve 78 is closed all slurry upstream of booster station 74 will be diverted through conduit 82 into the low pressure accumulator 80.

Each of three positive displacement pump assemblies 84, 86 and 88 have a positive displacement pump 90 operatively driven by a prime mover which may be a constant speed alternating current motor 92. Interconnected between the pump 90 and motor 92 is a variable speed fluid coupling 94 which controls the speed of the positive displacement pump 90. The variable speed fluid coupling 94 provides a wide range of speed for the positive displacement pump 90.

The low pressure sides or inlets of the positive displacement pumps in the assemblies 84, 86 and 88 are connected to the low pressure accumulator 80 by means of conduits 96, 98 and 100 respectively. The high pressure sides or outlets of the positive displacement pumps in the assemblies 84, 86 and 88 are connected by respective conduits 102, 104 and 106 to a high pressure accumulator 108. The high pressure accumulator 108 is connected to the main pipeline 70 downstream of valve 78 by means of conduit 110.

A flushing water conduit 112 is connected to the pump inlet or low pressure conduits 96, 98 and 100 at valves 114, 116 and 118 respectively. A pump 120 is positioned in conduit 112 and is operable to convey flushing water through conduit 112 to the respective pump inlet conduits 96, 98 and 100 when it is desired to flush the various pumps prior to inspection and repair. As will later be explained, the flushing water may also serve as a supplemental source of liquid when the upstream supply of slurry decreases below a predetermined amount.

The low pressure or suction accumulator 80 has liquid level probes 124 positioned therein. The probes 124 are connected to a liquid level indicator 126 by means of conduits 128. The liquid level indicator is operable to indicate the level of slurry within the low pressure or suction accumulator 80. In a similar manner the high pressure or discharge accumulator 108 has a plurality of liquid level probes 130 positioned therein which in a similar manner are connected to a second liquid level indicator 132 by means of conduits 134.

A source of inert gas indicated at 136 is connected by means of conduits 138 and 140 to conduits 142 and 144 which in turn are respectively connected to the top portion of the suction and discharge accumulators 80 and 108. The conduits 142 and 144 extend beyond their connection to the conduits 138 and 140 and terminate in an open conduit which serves as a vent. Valves 146 and 148 are respectively connected in the conduits 142 and 144 beyond their connection to the conduits 138 and 140 and are operable to vent the inert gas contained in the high and low pressure accumulators 80 and 108 to the atmosphere. The conduits 138 and 140 have valves 150 and 152 connected therein which are operable to regulate the admission of inert gas from the storage means 136 to the respective suction and discharge accumulators 80 and 108. With the above described arrangements it is possible to either add or remove inert gas from the suction and discharge accumulators 80 and 108 by manipulating respective valves 146, 150 and 148, 152.

A pressure indicator and controlling instrument, which for convenience will be termed a pressure controller 154, is connected with the suction accumulator 80 and the discharge accumulator 108 by means of conduits 156 and 158 respectively. Each of the variable fluid drives 94 of the respective positive displacement pump assemblies 84, 86 and 88 has an air motor 160 which is operable to vary the amount of fluid within the fluid coupling 94 and thus vary the speed of the positive displacement pumps 90. The air motors 160 are connected by means of conduits 162 to the pressure controller 154. Positioned in the conduits 162 are manual and automatic switches 164 which permit either manual or automatic operation of the respective air motor 160. As will be described in more detail later, when the switches 164 are positioned for automatic operation, the respective speeds of the positive displacement pumps 90 are dependent upon the inert gas pressures within the suction accumulator 80 and discharge accumulator 108.

Referring to Figure 1 the positive displacement pump assemblies 44, 46 and 48 are similar in arrangement to the pump assemblies previously described as part of the intermediate booster stations. The output of the pump assemblies in the receiving station 14 is primarily regulated by flow control. A flow measuring element 166 which is diagrammatically illustrated as the flow nozzle, is positioned in the pipeline 70 beyond the outlet from the high pressure accumulator 62. The flow measuring element 166 is connected by a conduit 168 to a combined flow and pressure recorder and controller 170. The flow and pressure controller 170 is connected by conduit 171 to air motors 173 which regulate the speed of the pumps in assemblies 44, 46 and 48. In addition, the conduit 172 connects the high pressure accumulator 62 to the flow and pressure controller 170. The high pressure control arrangement functions in a manner similar to the pressure controllers of the intermediate stations. The primary control, however, is the flow portion of the flow and pressure controller 170. Under emergency conditions the pressure portion of controller 170, regulated by the pressure in the high pressure accumulator 62, overrides the flow portion of controller 170 to limit maximum discharge pressure of the various pump assemblies 44, 46 and 48. The operation of the flow and pressure controller 170 is set forth in detail in conjunction with the operation of the pipeline.

The high pressure accumulator 62 also has liquid level probes 174 connected to a level indicator 176 by means of conduits 178. The probes 174 indicate the level of the slurry in the high pressure accumulator 62. In a manner similar to stations 74 and 76, receiving station 14 has a source of inert gas 175 which is connected to the high pressure accumulator by conduits 177 and 179. Conduit 179 has an open end portion which serves as a vent and valves 181 and 183 regulate the volume of inert gas in the high pressure accumulator 62.

In receiving station 14 there is also a chemical feed tank 180 which contains both the corrosion inhibitor and erosion inhibitor. A pump 182 is adapted to convey predetermined amounts of the inhibitor through conduit 184 to the slurry storage tank 16 where the inhibitor is mixed with slurry.

In a similar manner intermediate stations 74 and 76 have chemical tanks 186 which by means of pumps 188 supply inhibitor through conduits 190 to the main pipeline 70 immediately upstream of the low pressure accumulator 80. Valve means 192 is positioned in the conduits 190 and regulates the rate of flow of inhibitor into the pipeline 70. A separate means (not disclosed) determines the amount of inhibitor required at each intermediate booster station.

Figure 3:
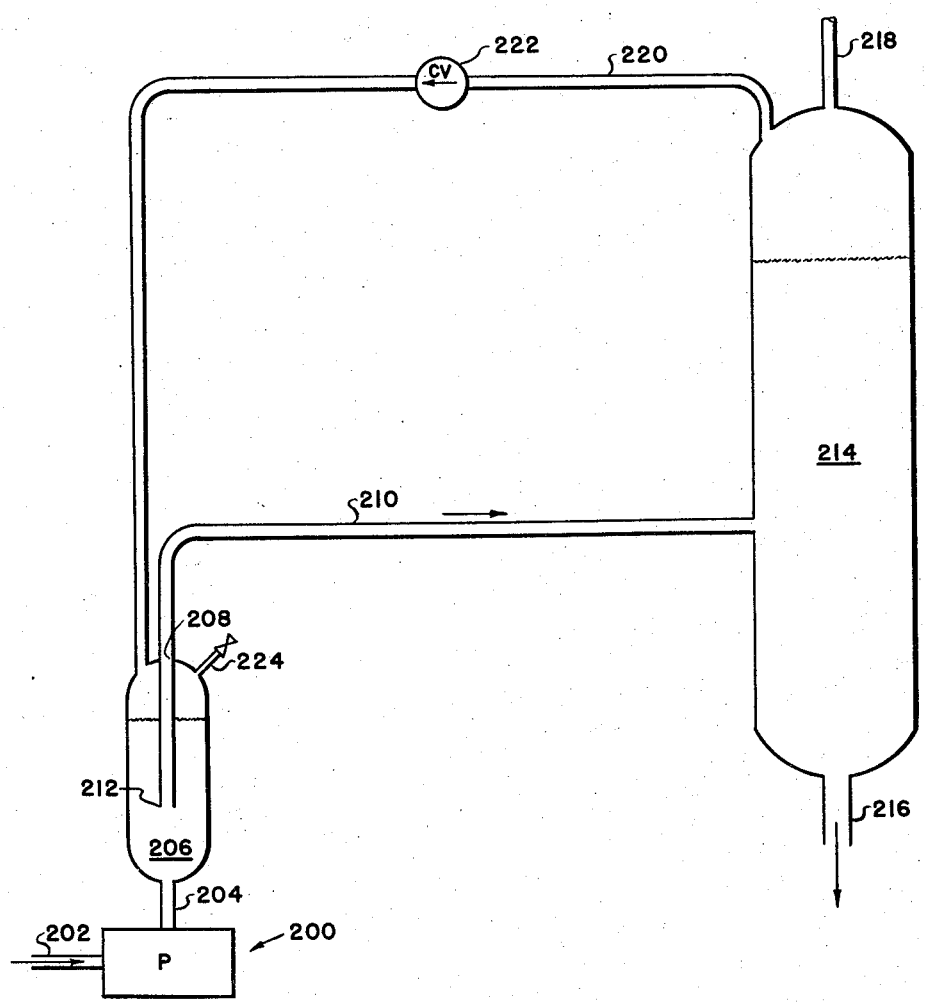
Figure 3 is a diagrammatic view of an improved means to minimize pressure surges of a positive displacement pump.

In Figure 3 there is diagrammatically illustrated a further refinement in the appparatus illustrated in Figures 1 and 2 whereby "water hammer" and vibration created by the instantaneous flow stoppages of slurry can be further reduced. The positive displacement pump is diagrammatically illustrated at 200 with an inlet conduit 202 and an outlet conduit 204. A surge pot 206 is connected at its lower portion to the pump outlet conduit 204 and has an opening 208 in its upper portion. A conduit 210 extends through opening 208 and has its end portion 212 terminate adjacent the lower portion of the surge pot 206. The conduit 210 is connected at its other end to a high pressure accumulator 214 which is similar to the high pressure accumulators 62 and 108 illustrated in Figures 1 and 2. The high pressure accumulator 214 has an outlet 216 adjacent its lower portion which is connected into the main pipeline (not shown), and an inert gas conduit 218 adjacent its upper portion. The inert gas conduit 218 is similar to conduits 144 and 179 in Figures 1 and 2 and serves to both supply and vent the inert gas from the high pressure accumulator 214. A second conduit 220 is connected at one end to the high pressure accumulator 214 and at the other end to the surge pot 206. A check valve 222 is positioned in the conduit 220 and provides for flow in one direction only, the direction of flow being from high pressure accumulator 214 to surge pot 206. A vent means 224 is also provided in pot 206 to regulate slurry level therein. The dotted lines extending across both the accumulator 214 and the surge pot 206 indicate the level of slurry therein.

The apparatus illustrated in Figure 3 operates as follows. Each stroke of the piston of the positive displacement pump 200 ejects a "slug" of slurry at high pressure into the discharge conduit 204. After each stroke of the piston, there is a partial vacuum created in the discharge conduit 204 which results in a flow pattern of alternate "slugs" of high pressure slurry and intervals of partial vacuum in the conduit 204. This type of flow pattern results in the literal lifting and dropping of the slurry within the accumulator. The slurry within the accumulator is literally lifted by the addition of each slug of slurry, and dropped again by the partial vacuum that follows. The lifting and dropping of the slurry within the accumulator 214 results in vibrations within the accumulator and the conduits connected thereto.

To minimize the above described vibrations, a surge pot 206 is positioned between the positive displacement pump outlet and the accumulator 214. The surge pot 206 is connected to the source of inert gas and has an atmosphere of inert gas above the slurry within the pot 206. As the slug of high pressure slurry is discharged from pump 200 the inert gas within the pot 206 is compressed and a volume of high pressure slurry, less than the volume of the slug, is conveyed through conduit 210 to the accumulator 214. The partial vacuum that follows the slug of slurry is compensated for in the surge pot 206 by means of the atmosphere of pressurized inert gas above the supply of slurry therein. The partial vacuum phase of the flow pattern permits the pressurized inert gas to expand, thus forcing additional slurry through conduit 210 to the accumulator 214 which results in a continuous smooth flow of slurry from the surge pot 206 to the accumulator 214.

Operation

The operation of the closed circuit pipeline, illustrated in Figures 1 and 2, for convenience will be described in conjunction with the transportation of a coal-water slurry. It should be understood, however, it is within the scope of this invention to utilize the apparatus and controls herein disclosed in transporting any liquid or slurry in a similar manner. Also, several features of this invention such as the addition of inhibitors, additives and flushing water are desirable improvements which reduce the overall cost of transporting coal. However, it is within the scope of this invention to eliminate these features when not desired in transporting other types of liquids and slurries.

Normal operation

Under normal operating conditions the closed circuit pipeline operates as follows to transport a coal-water slurry from the slurry preparation tank 10 through the pipeline 70 over long distances to the slurry separation tank 72. Fine coal is mixed with water in the preparation tank 10 and conveyed to the slurry storage tank 16. The slurry is recycled in the storage tank 16 to maintain the particles of coal in suspension by means of the recycle pumps 20 and 22 and conduits 36 and 38. The recycle pumps 20 and 22 also convey a supply of slurry through conduits 26 and 28 to the pump feed conduit 24, where it is conveyed through branch conduits 50, 52 and 54 to the inlets of the positive displacement pumps in pump assemblies 44, 46 and 48. Excess slurry, not utilized by the pump assemblies, continues through conduit 24 and is returned to storage tank 16.

The pump output capacity of receiving station 14 is such that, under normal conditions, one of the pump assemblies serves as a standby unit while the other two assemblies are in operation. For example, assume pump assembly 44 is in standby and assemblies 46 and 48 are in operation. The high pressure slurry leaving assemblies 46 and 48 through conduits 66 and 68 enters the high pressure accumulator 62. A volume of inert gas is present in accumulator 62 which is compressed by the incoming slurry until the gas pressure is equal to the slurry pressure. The probes 174 in accumulator 62 indicate the level of the slurry within and valves 181 and 183 may be regulated to adjust the volume of inert gas within accumulator 62 which in turn adjusts the level of slurry therein.

Under normal conditions the rate of flow of the slurry through pipeline 70 adjacent receiving station 14 controls the speed of the pumps in pump assemblies 46 and 48. To control the rate of flow the flow measuring or sensing element 166 measures the rate of flow through pipeline 70 and transmits this rate of flow to the flow portion of the flow and pressure controller 170 through conduit 168. When the flow sensing element 166 indicates the rate of flow is below the desired rate, the flow portion of controller 170 transmits a signal through conduit 171 to air motors 173 which in turn regulate the amount of fluid in the hydraulic couplings to increase the speed of the pumps. The operation of the fluid couplings will be later explained in conjunction with an intermediate booster station. In a similar manner the sensing element 166 through the various controls will slow down the pumps to decrease their output.

The pumps and stations are constructed and arranged so that under normal conditions the pumps are operating well below their maximum design pressures and the slurry velocity in the pipeline 70 will be maintained above the critical settling velocity until the slurry reaches an intermediate booster station. Flow of slurry is diverted from pipeline 70 to intermediate booster station 74 by means of valve 78. The slurry enters the low pressure accumulator 80 through conduit 82, where, as in accumulator 62, there is a supply of inert gas that serves as both a cushion for the slurry and a delay means to allow the controls to function properly.

As in receiving station 14, one pump assembly usually serves as a standby, while the other two pump assemblies are operating to repressurize the slurry. For example, when pump assembly 84 is in standby, slurry flows from the low pressure accumulator 80 through slurry feed conduits 98 and 100 to the inlets of pumps 90 in assemblies 86 and 88. The high pressure slurry is discharged from the pumps 90 through conduits 104 and 106 and enters the high pressure accumulator 108, which is similar to accumulator 62 in receiving station 14. The slurry leaves the high pressure accumulator 108 through conduit 110 and reenters pipeline 70 upstream of valve 78. The slurry continues through pipeline 70 to the other intermediate booster station 76 where it is again repressurized in a manner similar to station 74. After leaving station 76, as shown in Figure 1, the slurry enters a slurry separation tank 72 where the coal particles settle to the bottom and are removed therefrom.

As distinguished from the output of receiving station 14, which is normally regulated by flow rate, the intermediate stations have their output normally regulated by slurry suction pressure. The functions of the control system of the intermediate stations are to first regulate the flow of slurry from the intermediate station so that it equals the supply to the station; second to limit station discharge pressure to a predetermined maximum and third, to maintain a minimum flow through the station. The second and third functions will be discussed in regard to emergency operation.

The pipeline 70 between receiving station 14 and the intermediate station 74 is a closed circuit and during operation is filled with slurry. The slurry in the slurry filled pipeline is utilized as the telemetering system to communicate various slurry pressures to the control apparatus. Thus by employing slurry pressure as an element of control, the slurry being transported through the pipeline 70 is thre sole communicating means between the receiving station and the various intermediate stations. With this arrangement, electrical or telephonic communication between the stations is no longer required as a portion of the control system.

The slurry, by its pressure as it arrives at the various intermediate stations, regulates the output of the pumps at these stations. The intermediate booster station suction pressure is the controlling variable. This suction pressure is measured at the suction accumulator 80 by means of the pressure controller 154 and conduit 156. As the suction pressure increases, the pressure of the inert gas within the accumulator 80 also increases. This increase of pressure is communicated to the pressure controller 154 through conduit 156, which in turn sends a signal through conduit 162 to the air motors 160. The air motors 160 then add fluid to the fluid coupling 94 and the pump output is increased so that the slurry discharge will again equal the slurry supply to the station. In a similar manner, when the slurry suction pressure decreases, the pumps, through the above described controls, will decrease their output and again the slurry supply to the station will equal the slurry discharge from the station.

Since there is a slight time delay between the impulses received by the pressure controller 154, and the pumps 90 either increasing or decreasing their output, a means is required to either retain the excess incoming slurry, or supply additional slurry to the system while the pumps are varying their output to normalize the system and equate slurry supply to slurry discharge at the intermediate station. The suction accumulator 80 functions as this means. For example, if one of the pumps 90 in intermediate station 74 suddenly decreased in efficiency or one of the pump valves malfunctioned, the intermediate station 74 would not be pumping slurry downstream at the same rate it was receiving upstream slurry from receiving station 14. Under these conditions the pressure of the slurry upstream of intermediate station 74 would increase above normal slurry pressure. In turn the pressure of the inert gas within the accumulator 80 would also increase incrementally. With the increase in inert gas pressure, there is also a corresponding decrease in the volume of the inert gas within the accumulator. The decrease in volume will permit the level of slurry to increase within the accumulator, thus compensating for the added slurry supply to the booster station. As the control system increases the speed of the pumps, the additional slurry will be withdrawn from the accumulator 80 and again the slurry output from intermediate station 74 will equal slurry input to the station 74. It should be understood, however, that the accumulator 80 does not serve as a reservoir or storage means for large volumes of slurry. It simply serves as a means to retain or supply necessary volumes of slurry while the various sensing instruments, controls and pumps react to the slurry pressure change. As will be later explained, the suction accumulator 80 additionally functions as a portion of the means employed to eliminate pressure pulsations in the pipeline.

In both the receiving station 14 and intermediate stations 74 and 76, there are means to add both a corrosion inhibitor and an erosion inhibitor. In receiving station 14 predetermined amounts of both of the inhibitors are mixed in a tank 180 and conveyed to the slurry storage tank 16 by means of pump 182 and conduit 184. At the intermediate stations 74 and 76, samples of the slurry arriving at the stations are withdrawn and tested for inhibitor consumption. Additional inhibitor is added to the slurry in the pipeline from tank 186 as required.

*Emergency Operation*

One of the basic requisites in transporting a coal-water slurry is to maintain the slurry in continuous movement throughout the pipeline, even under emergency conditions. Any stoppage of flow while the slurry is in the main pipeline results in the coal particles settling in the pipeline and additional problems in their removal. Accordingly, several emergency conditions are provided for.

If there is a loss of power at booster station 74, the additional high pressure staging of this station is also lost. The inoperativeness of station 74 places an added burden on the pumps in receiving station 14 in that the pumps must now develop an incrementally higher slurry pressure to convey the slurry the added distance to second booster station 76 at the minimum velocity required. Since the primary control of receiving station 14 is flow control regulated by the flow sensing element 166, the additional pressure required to by-pass station 74 would reflect in the flow controller only in increasing the speed of the pumps. This in turn would increase the pump slurry discharge pressure to a point where the pumps would exceed their maximum design pressure and both the pipeline and pumps could be damaged thereby. To prevent the pumps from exceeding their maximum design pressure, the overriding pressure portion of the flow and pressure controlerr 170 is included in the receiving station 14. The pressure portion of controller 170 is operable, at a predetermined pressure, to override the flow portion of the controller 170. The pressure portion of the controller 170 is in communication with the discharge accumulator 62 by means of conduit 172. As the slurry pressure in accumulator 62 increases, the inert gas therein also increases. When this pressure exceeds a predetermined value, an override mechanism within the controller 170 sends impulses through conduit 171 to air motors 173 which in turn regulates the speeds of the pumps to maintain the pressure within the discharge accumulator below a predetermined value. In this manner, the pumps do not exceed their design pressure, and yet, the slurry is still being transported through the pipeline. When intermediate booster station 74 is again operating and the pressure within accumulator 62 again decreases below a predetermined pressure, the override mechanism within controller 170 is rendered ineffective and the flow sensing element 166 again governs the pump speed.

In the event there is a loss of supply of slurry from the slurry storage tank 16, or both supply pumps 20 and 22 malfunction, flushing water from tank 25 will be conveyed to pump assemblies 44, 46 and 48 to flush the main pipeline 70 of slurry and thereby prevent settling of coal particles in the pipeline.

In a similar manner both intermediate stations 74 and 76 have a high pressure override mechanism which, at a predetermined high pressure, will override the suction or low pressure controller and limit the output pressures of the various pump assemblies. The high pressure controller of the intermediate stations includes the pressure controller 154 which, through conduit 158, is in communication with the high pressure accumulators 108 and senses the output pressure of the slurry by measuring the corresponding pressure of the inert gas. The controller, in a similar manner through conduits 162 and air motors 160, regulates the speed of the pumps 90 to maintain a predetermined maximum slurry output pressure.

Another feature of the intermediate booster stations is the means provided to prevent the suction supply of slurry from falling below the demand of the pumps even when the pumps are running at minimum speed. For example, when the upstream supply of slurry to an intermediate booster station falls below a predetermined value, the pressure of the slurry will also decrease until the pumps through the low pressure controller are operating at minimum speed. If the supply of slurry is still not sufficient to meet the demand of the pumps, the additional slurry will be removed from the suction accumulator 80. With this withdrawal of additional slurry, the inert gas pressure within accumulator 80 will also incrementally decrease. At a predetermined minimum value, flushing water pump 120 is actuated and flushing water is added to conduits 96, 98 and 100 by means of conduit 112 and valves 114, 116 and 118. Thus, with the addition of flushing water flow is maintained through the intermediate station.

The output of positive displacement pumps arranged in series in a closed circuit pipeline heretofore has resulted in pressure fluctuations or "water hammer" of such severity that commercial use of this pumping arrangement was not deemed economically sound. The principal cause of the pressure fluctuations, it is believed, is the pressure cycle or pulsating flow of the upstream pumps. As described in reference to Figure 3, the flow pattern of a positive displacement pump appears to be a series of "slugs" of high pressure slurry, with alternate voids or low pressure areas. This flow pattern is caused by the intermittent output of positive displacement pumps. We believe the shock or hammer is caused by the high pressure "slug" of slurry changing its velocity when it attempts to equalize in pressure with the low pressure area. The rapid change in velocity of the slurry results in shock waves which are transmitted downstream along the pipeline.

We have found by experimentation that a single pressure accumulator placed in the pipeline between a pair of series pumps does not adequately reduce the pressure fluctuations. Nor does the position of the accumulator relative to the various pumps reduce the pressure fluctuations sufficiently to make the pump arrangement attractive commercially. For example, we found that an accumulator positioned adjacent to the outlet of the upstream pump did not reduce these shock pressures.

When the accumulator was positioned adjacent the inlet of the downstream pump, the pressure cycle and pulsating flow of the upstream pump resulted in prohibitive pressure fluctuations. We discovered, by using a pair of accumulators between a pair of positive displacement pumps arranged in series, that the pressure fluctuations usually present are substantially eliminated. The preferred positions of the accumulators are one adjacent the upstream pump outlet and the other adjacent the downstream pump inlet.

With this arrangement, under normal pumping conditions where the input of the downstream station is matched to the output of the upstream station, the slurry within the pipeline between the pumps moves as a unit. The upstream accumulator supplies pressurized slurry to eliminate the areas of low pressure between the "slugs" of a slurry as they leave the outlets of the pumps. The downstream accumulator furnishes a cushion of compressed gas for the mass of slurry. When the gas pressure of the downstream accumulator momentarily increases above the slurry pressure due to the additional slurry added to the pipeline from the upstream accumulator, the high pressure gas in the downstream accumulator will tend to push the slurry level down in that accumulator and attempt to equalize the pressure in the segment of the pipeline between the accumulators. This results in a segment of pipeline literally filled with pressurized slurry and additional pressurized slurry being added thereto and other slurry being removed therefrom. The accumulators thus additionally serve as a means to maintain the supply of slurry within the pipeline segment and cushion both the pulsating addition and intermittent removal of the slurry from the pipeline segment.

In the foregoing specification and the following claims the expression "closed circuit pipeline" is intended to be understood in its broadest sense so that the circuit of the pipeline begins at the receiving station and terminates at the slurry separation tank 72 at the discharge end of the pipeline. With this arrangement once the liquid enters the pipeline at the receiving station 14 it is not exposed to air or oxidizing conditions until it is discharged from the pipeline at the slurry separation tank 72.

Throughout this specification, the size consists of the coal particles, the concentration of the coal in the coal-water slurry, the velocity of the slurry as it is transported through the pipeline, and other critical relationships are not discussed since they do not form a part of this invention. Some of these critical relationships are set forth in the following copending applications: "Method of Reducing Metal Losses in Coal Slurry Transportation Pipelines," Serial No. 427,568, now Patent No. 2,791,472, and "Transportation of Coal by Pipeline," Serial No. 388,399, now Patent No. 2,791,471, which are assigned to the same assignee. In addition, the various controllers and indicators are not described in detail since they are of conventional design and may be readily purchased from instrument manufacturers.

Although the above system has been described in conjunction with positive displacement pumps, it should be understood that the above described arrangement is equally applicable to a combination of centrifugal and positive displacement pumps or the combination of centrifugal pumps arranged in series where pressure fluctuations are present in a lesser degree.

It should also be noted that the suction and discharge accumulators perform a dual function. The first function is assisting in eliminating pressure pulsations in the pipeline and the second function, through the various controls, is keeping the entire pumping system in balance, that is, equating the output of the booster stations 74 and 76 to the output of receiving station 14.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. In a pipeline system comprising in combination, a pipeline, a receiving station connected to the upstream end of said pipeline, a booster station connected in said pipeline in series with, and downstream of said receiving station, said receiving station and said booster station each having pumping means operable to convey a liquid through said pipeline, said receiving station having first control means operable to regulate the output of said pumping means in said receiving station, said first control means being responsive to the rate of flow of liquid in said pipeline downstream of said receiving station, and said booster station having second control means operable to regulate the output of said pumping means in said booster station, said second control means being responsive to the pressure of said liquid being conveyed through said pipeline upstream of said booster station and operable to maintain the discharge flow of liquid from said booster station substantially equal to the supply flow of liquid to said booster station so that said liquid being conveyed through said pipeline serves as a telemetering means and maintains the output of liquid from said booster station substantially equal to the output of liquid from said receiving station.

2. In a pipeline system adapted to transport a coal-water slurry the combination comprising a pipeline, a receiving station connected to the upstream end of said pipeline, a booster station connected in said pipeline in series with and downstream of said receiving station, said receiving station and said booster station each having positive displacement pumping means operable to convey a slurry through said pipeline, said receiving station having first control means operable to regulate the output of said positive displacement pumping means in said receiving station, said first control means being responsive to the rate of flow of slurry in said pipeline downstream of said receiving station, said booster station having second control means operable to regulate the output of said positive displacement pumping means in said booster station, said second control means being responsive to the pressure of said slurry being conveyed through said pipeline upstream of said booster station and operable to maintain the discharge flow of slurry from said booster station substantially equal to the supply flow of slurry to said booster station so that said liquid being conveyed through said pipeline serves as a telemetering means and maintains the output of slurry from said booster station substantially equal to the output of slurry from said receiving station, and means to absorb the slurry pressure fluctuations in said pipeline between said receiving station and said booster station.

3. In a pipeline system adapted to transport a coal-water slurry the combination comprising a pipeline, a receiving station connected to the upstream end of said pipeline, a booster station connected in said pipeline in series with and downstream of said receiving station, said receiving station and said booster station each having positive displacement pumping means operable to convey a slurry through said pipeline, said receiving station having a first control means operable to regulate the output of said positive displacement pumping means in said receiving station, said first control means being responsive to the rate of flow of slurry in said pipeline downstream of said receiving station, said booster station having a second control means operable to regulate the output of said positive displacement pumping means in said booster station, said second control means being responsive to the pressure of said slurry being conveyed through said pipeline upstream of said booster station and operable to maintain the discharge flow of slurry from said booster station substantially equal to the supply flow of slurry to said booster station so that said liquid being conveyed through said pipeline serves as a telemetering means and maintains the output of slurry from said booster station substantially equal to the output of slurry from said receiving station, said receiving station having third control means operable to regulate the output of said positive displacement pumping means in said receiving station, said third control means being responsive to the pressure of said slurry on the discharge side of said receiving station pumping means and operable at a predetermined slurry pressure to override said first control means and maintain said receiving station positive displacement pumping means discharge pressure at a predetermined pressure while pumping slurry therethrough, and means to absorb the slurry pressure fluctuations in said pipeline between said receiving station and said booster station.

4. In an intermediate booster station adapted to be positioned in a pipeline the combination comprising a pipeline, positive displacement pumping means operable to pressurize liquid being transported through said pipeline, a first control means operable to regulate the output of said positive displacement pumping means, said first control means being responsive to the pressure of said liquid in said pipeline upstream of said pumping means and operable to maintain the discharge flow of liquid substantially equal to the suction flow of liquid to said positive displacement pumping means, and second control means operable to control the output of said positive displacement pumping means, said second control means being responsive to the pressure of said liquid on the discharge side of said positive displacement pumping means and operable at a predetermined discharge pressure of said liquid to override said first control means and maintain said positive displacement pumpng means discharge pressure below a predetermined pressure while pumping liquid therethrough.

5. In a pipeline system adapted to transport a coal-water slurry therethrough comprising in combination, a pipeline, a receiving station connected to the upstream end of said pipeline, a booster station connected in said pipeline in series with and downstream of said receiving station, said receiving station and said booster station each having a plurality of positive displacement pumps connected to said pipeline, said pipeline having a plurality of closed tank accumulators positioned therein between said receiving station and said booster station, one of said accumulators being positioned adjacent to and downstream of said receiving station and another of said accumulators being positioned adjacent to and upstream of said booster station, and each of said accumulators having a voulme of compressible gas therein operable to absorb pressure fluctuations in said pipeline.

6. In a pipeline system adapted to transport a coal-water slurry, the combination comprising a pipeline, a receiving station connected to the upstream end of said pipeline, a booster station connected in said pipeline in series with and downstream of said receiving station, said receiving station and said booster station each having a plurality of positive displacement pumps operable to convey a slurry through said pipeline, said receiving station having a first closed tank accumulator downstream of said positive displacement pumps within said receiving station, said booster station having a second closed tank accumulator upstream of said positive displacement pumps within said booster station, said accumulators being spaced from each other, said accumulators each having a supply of inert gas therein, said receiving station having first control means operable to regulate the output of said pumps within said receiving station, said first control means being responsive to the flow of slurry downstream of said first accumulator, and said booster station having second control means operable to regulate the output of said pumps within said booster station, said second control means being responsive to the pressure of said inert gas within said second accumulator and operable to regulate the output of said intermediate station pumps to maintain the discharge flow of slurry from said booster station equal to the supply flow of slurry to said booster station so that the output of slurry from said booster station is equal to the output of slurry from said receiving station.

7. In a pipeline system adapted to transport a coal-water slurry, the combination comprising a pipeline, a receiving station connected to the upstream end of said pipeline, a booster station connected in said pipeline in series with and downstream of said receiving station, said receiving station and said booster station each having a plurality of positive displacement pumps operable to convey a slurry through said pipeline, said receiving station having a first closed tank accumulator downstream of said positive displacement pumps within said receiving station, said booster station having a second closed tank accumulator upstream of said positive displacement pumps within said booster station, said accumulators being spaced from each other, said accumulators each having a supply of inert gas therein, said receiving station having first control means operable to regulate the output of said pumps within said receiving station, said first control means being responsive to the flow of slurry downstream of said first accumulator, said booster station having second control means operable to regulate the output of said pumps within said booster station, said second control means being responsive to the pressure of said inlet gas within said second accumulator and operable to regulate the output of said booster station pumps to maintain the discharge flow of slurry from said booster station equal to the supply flow of slurry to said booster station so that the output of slurry from said booster station is equal to the output of slurry from said receiving station, and said receiving station having third control means operable to regulate the output of said pumps within said receiving station, said third control means being responsive to the pressure of said inert gas within said first accumulator and operable above a predetermined pressure to override said first control means and maintain the discharge pressure of said pumps within said receiving station at a predetermined pressure while pumping slurry therethrough.

8. In a pipeline adapted to transport a coal-water slurry, the combination comprising a pipeline, a receiving station connected to the upstream end of said pipeline, a plurality of booster stations connected in said pipeline in series with each other and with said receiving station, said receiving station and said booster stations each having a plurality of positive displacement pumps operable to convey a slurry through said pipeline, said receiving station having a high pressure closed tank accumulator adjacent to and downstream of said pumps within said receiving station, means connecting the outlets of said receiving station pumps to said accumulator, means connecting said accumulator to said pipeline, said booster stations each having a low pressure closed tank accumulator and a high pressure closed tank accumulator, said low pressure accumulator being connected to said pipeline upstream of said booster station pumps, the inlets of said booster station pumps being connected to said low pressure accumulator, said high pressure accumulator being connected to said pipeline downstream of said booster station pumps, means connecting the outlets of said booster station pumps to said high pressure accumulator, said accumulators each having a supply of inert gas therein, said receiving station having a first control means and a second control means, both of said control means being operable to regulate the output of said receiving station pumps, said first control means being responsive to the flow of slurry downstream of said receiving station high pressure accumulator, said second control means being responsive to the pressure of said gas within said receiving station high pressure accumulator and operable above a predetermined gas pressure to override said first control means and maintain the discharge pressure of said receiving station pumps at a predetermined pressure while pumping slurry therethrough, and said booster stations each having a third control means and a fourth control means, said third and fourth control means being operable to regulate the output of the respective booster station pumps, said third control means being responsive to the inert gas pressure in said respective booster station low pressure accumulator and operable to regulate the output of said booster station to maintain the discharge flow of slurry from said respective station equal to the supply flow of slurry to said respective booster station so that the output of slurry from said respective booster station is equal to the output of slurry from said adjacent upstream station, said fourth control means being responsive to the pressure of said inert gas within said respective booster station high pressure accumulator and operable above a predetermined pressure to override said third control means and maintain the discharge pressure of said respective booster station pumps at a predetermined pressure while pumping slurry therethrough.

9. In the pipeline as set forth in claim 8, in which said booster stations each having a supply of flushing liquid, means connecting said supply of liquid to the inlets of said respective booster station pumps so that said flushing liquid may be introduced into said pipeline, flushing liquid control means responsive to the pressure of said inert gas within said respective booster station low pressure accumulator, said flushing liquid control means being operable at a predetermined minimum inert gas pressure to introduce said flushing liquid into the inlets of said respective booster station pumps.

10. In the pipeline as set forth in claim 9, in which said booster stations each have a supply of inhibitor, means to measure the inhibitor at said respective booster station and means to introduce additional inhibitor from said inhibitor supply into said pipeline.

11. In a pulsation dampener for use wtih a positive displacement pumping means the combination comprising a positive displacement pump having a discharge outlet, a first closed tank accumulator positioned adjacent to said pump discharge outlet, a first conduit connecting said pump discharge outlet to the lower portion of said first accumulator, a second closed tank accumulator having a liquid outlet adjacent its lower portion and a liquid inlet adjacent its intermediate portion, a second conduit connected at one end to said second accumulator inlet and its other end extending through the top portion of said first accumulator and terminating adjacent said first accumulator lower portion, said first accumulator and said second accumulator each adapted to retain a supply of liquid therein, said accumulators each having a supply of inert gas above said liquid operable by compression to absorb the pulsating pressures exerted by the liquid discharged from said positive displacement pump and means to supply inert gas to said accumulators.

12. In a pulsation dampener as set forth in claim 11 in which said second accumulator has an opening adjacent its upper portion, an inert gas supply conduit positioned in said opening, a second conduit connecting the supply of inert gas in said second accumulator to the supply of inert gas in said first accumulator, and a check valve in said second conduit limiting the direction of flow of inert gas to a direction from said second accumulator to said first accumulator.

13. In a pulsation dampener for use with positive displacement pumping means the combination comprising a positive displacement pump having a discharge outlet, a first closed tank accumulator positioned adjacent to said pump discharge outlet, said accumulator having a liquid inlet opening adjacent its lower portion and a liquid outlet opening adjacent its upper portion, said first accumulator having an inert gas inlet opening adjacent said liquid outlet opening and an inert gas outlet opening adjacent said liquid outlet opening, a first conduit connecting said pump discharge outlet to said first accumulator fluid inlet opening and operable to convey liquid under pressure from said pump to said first accumulator, a second accumulator positioned in spaced relation to said first accumulator and having a liquid discharge opening adjacent its lower portion and a liquid inlet opening intermediate its top portion and bottom portion, said second accumulator having an inert gas inlet opening adjacent its top portion and a second inert gas opening adjacent said gas inlet opening, a second conduit connected at one end to said second accumulator inlet opening and its other end extending through said first accumulator outlet opening and terminating adjacent said first accumulator lower portion, said second conduit being operable to convey liquid from said first accumulator to said second accumulator, a third conduit connecting said second accumulator gas inlet opening to a supply of inert gas under pressure, a fourth conduit connecting said second accumulator second inert gas opening with said first accumulator gas inlet opening, said fourth conduit adapted to convey inert gas from said second accumulator to said first accumulator, a check valve in said fourth conduit, and valve means positioned in said first accumulator gas outlet opening, said first accumulator adapted to retain a supply of liquid therein having an upper level above said second conduit end portion extending into said first accumulator, said second accumulator adapted to retain a supply of liquid therein having an upper level above said liquid inlet opening, said accumulators each having a supply of inert gas above said liquid operable by compression to absorb the pulsating pressures exerted by the liquid discharged from said positive displacement pump.

14. In a receiving station for a pipeline the combination comprising a pipeline, a storage tank adapted to retain a supply of coal-water slurry therein, said storage tank having a bottom outlet, first pumping means connected to said tank outlet, positive displacement pumping means operable to introduce slurry under pressure into said pipeline, said first pumping means being operable to supply slurry from said storage tank to the inlet of said positive displacement pumping means and to recirculate slurry in said storage tank to maintain said coal particles in said slurry in suspension, conduit means connecting the outlet of said first pumping means to the inlet of said positive displacement pumping means and connecting the outlets of said first pumping means to said storage tank, and first control means and second control means operable to regulate the output of said positive displacement pumping means, said first control means being responsive to flow of liquid downstream of said receiving station, said second control means being responsive to the liquid discharge pressure of said pumping means and operable at a predetermined pressure to override said first control means and maintain said positive displacement pumping means discharge pressure at a predetermined pressure while pumping liquid therethrough.

15. A pipeline system as set forth in claim 5 including conduits between the outlets of said receiving station positive displacement pumps and said pipeline, and each of said conduits having an accumulator positioned therein adjacent said positive displacement pump outlets.

16. In a closed circuit pipeline adapted to transport a coal-water slurry, the combination comprising a pipeline, a receiving station connected to the upstream end of said pipeline, a pair of booster stations connected in said pipeline in series with each other and with said receiving station, a discharge terminus connected to the downstream end of said pipeline, said receiving station and said booster stations each having a plurality of positive displacement pumps operable to convey a slurry through said pipeline, said receiving station having a high pressure closed tank accumulator downstream of and spaced from said receiving station pumps, conduit means connecting the outlets of said receiving station pumps to said high pressure accumulator, auxiliary closed tank accumulators positioned in said conduit means between said positive displacement pump outlets and said high pressure accumulator, means connecting said high pressure accumulator to said pipeline, said booster stations each having a low pressure closed tank accumulator and a high pressure closed tank accumulator, said low pressure accumulator being connected to said pipeline upstream of said booster station pumps, the inlets of said booster station pumps being connected to said low pressure accumulator, said high pressure accumulator being connected to said pipeline downstream of and spaced from said booster station pumps, conduit means connecting the outlets of said booster station pumps to said high pressure accumulator, other auxiliary closed tank accumulators positioned in said conduit means between said pump outlets and said high pressure accumulator, said accumulators each having a supply of inert gas therein, said receiving station having a first control means and a second control means, both of said control means being operable to regulate the output of said receiving station pumps, said first control means being responsive to the flow of slurry downstream of said receiving station high pressure accumulator, said second control means being responsive to the pressure of said gas within said receiving station high pressure accumulator and operable above a predetermined gas pressure to override said first control means and maintain the discharge pressure of said receiving station pumps at a predetermined pressure while pumping slurry therethrough, and said booster stations each having a third control means and a fourth control means, said third and fourth control means being operable to regulate the output of the respective booster station pumps, said third control means being responsive to the inert gas pressure in said respective booster station low pressure accumulator and operable to regulate the output of said booster station to maintain the discharge flow of slurry from said respective station equal to the supply flow of slurry to said respective booster station so that the output of slurry from said respective booster station is equal to the output of slurry from said adjacent upstream station, said fourth control means being responsive to the pressure of said inert gas within said respective booster station high pressure accumulator and operable above a predetermined pressure to override said third control means and maintain the discharge pressure of said respective booster station pumps at a predetermined pressure while pumping slurry therethrough.

17. A pipeline system comprising in combination a pipeline, a first booster station connected to said pipeline, a second booster station connected to said pipeline in series with and downstream of said first booster station, each of said first and second booster stations having positive displacement pumping means operable to pressurize liquid transported through said pipeline, and each of said booster stations having a control means responsive to the liquid pressure in said pipeline upstream of said respective booster station and operable to maintain the discharge flow of liquid from said respective booster station substantially equal to the suction flow of liquid to said respective booster station.

18. A pipeline system as set forth in claim 17 which includes a second control means for said first booster station, said second control means being responsive to the pressure of said liquid on the discharge side of said first booster station positive displacement pumping means and operable at a predetermined discharge pressure of said liquid to override said first booster station first control means and maintain said positive displacement pumping means discharge pressure below a predetermined pressure while pumping liquid therethrough.

19. A pipeline system as set forth in claim 17 which includes a plurality of closed tank accumulators positioned in said pipeline between said first booster station and said second booster station, one of said accumulators being positioned adjacent to and downstream of said first booster station and the other of said accumulators being positioned adjacent to and upstream of said second booster station, and each of said accumulators having a volume of compressible gas therein operable to absorb pressure fluctuations in said pipeline.

References Cited in the file of this patent
UNITED STATES PATENTS

| | | |
|---|---|---|
| 2,526,646 | Ericson | Oct. 24, 1950 |
| 2,697,449 | Svenson | Dec. 21, 1954 |
| 2,741,986 | Smith | Apr. 17, 1956 |

FOREIGN PATENTS

| | | |
|---|---|---|
| 635,883 | Germany | Sept. 25, 1936 |

UNITED STATES PATENT OFFICE

CERTIFICATE OF CORRECTION

Patent No. 2,880,745                                            April 7, 1959

Thomas J. Regan et al.

It is hereby certified that error appears in the above numbered patent requiring correction and that the said Letters Patent should read as corrected below.

In the grant, lines 2 and 3, and line 13, and in the heading to the printed specification, lines 5 and 6, name of assignee, for "Consolidated Coal Company" read -- Consolidation Coal Company --; column 7, line 49, for "within" read -- therein --; column 13, line 52, for "voulme" read -- volume -- column 14, line 30, for "inlet" read -- inert --; column 15, line 26, for "having" read -- have --.

Signed and sealed this 1st day of September 1959.

(SEAL)

Attest:
KARL H. AXLINE
Attesting Officer

ROBERT C. WATSON
Commissioner of Patents